US012743619B2

(12) United States Patent
Qian et al.

(10) Patent No.: US 12,743,619 B2
(45) Date of Patent: Sep. 22, 2026

(54) PROGRESSIVE DEEP METRIC LEARNING

(71) Applicant: ObjectVideo Labs, LLC, Tysons, VA (US)

(72) Inventors: Gang Qian, McLean, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 1129 days.

(21) Appl. No.: 17/845,349

(22) Filed: Jun. 21, 2022

(65) Prior Publication Data

US 2023/0011337 A1 Jan. 12, 2023

Related U.S. Application Data

(60) Provisional application No. 63/220,681, filed on Jul. 12, 2021.

(51) Int. Cl.
*G06N 3/08* (2023.01)
*G06V 10/82* (2022.01)
*G06V 20/52* (2022.01)

(52) U.S. Cl.
CPC ............... *G06N 3/08* (2013.01); *G06V 10/82* (2022.01); *G06V 20/52* (2022.01)

(58) Field of Classification Search
CPC ........... G06N 3/08; G06V 10/82; G06V 20/52
See application file for complete search history.

(56) References Cited

U.S. PATENT DOCUMENTS 12,190,245 B2 * 1/2025 Cheng .................... G06N 3/044
2016/0140436 A1 * 5/2016 Yin ...................... G06V 30/194 706/20
2018/0268284 A1 * 9/2018 Ren ........................ G06N 20/00
2019/0095795 A1 * 3/2019 Ren ........................ G06N 3/082
2020/0193296 A1 * 6/2020 Dixit ...................... G06N 20/10
2020/0265301 A1 * 8/2020 Burger ..................... G06N 3/08
2020/0287814 A1 * 9/2020 Zhao ................... G06F 18/2178
2021/0034960 A1 * 2/2021 Khapali ................ G06N 3/082
2021/0312591 A1 * 10/2021 Ren ........................ G06N 3/094
2022/0245928 A1 * 8/2022 Tan ...................... G06N 3/0495
(Continued)

OTHER PUBLICATIONS

Zeng et al., "Multi-Stage Contextual Deep Learning for Pedestrian Detection," 2013 IEEE International Conference on Computer Vision, pp. 121-128. (Year: 2013).*
(Continued)

*Primary Examiner* — Eric J. Bycer
(74) *Attorney, Agent, or Firm* — Fish & Richardson P.C.

(57) ABSTRACT

Methods, systems, and apparatus, including computer programs encoded on computer storage media, for progressive deep metric learning. One of the methods includes maintaining training data for training a machine learning model that will include a plurality of blocks after training. A number of training stages is determined using the plurality of blocks in the machine learning model. The machine learning model is trained using the training data in a plurality of stages, including, for each stage: adding, from the plurality of blocks, a new block for a current stage to the machine learning model; and training the machine learning model using the training data. The trained machine learning model that includes the plurality of trained blocks is outputted.

20 Claims, 4 Drawing Sheets

(56) References Cited

U.S. PATENT DOCUMENTS

| | | | | |
|---|---|---|---|---|
| 2022/0318229 | A1* | 10/2022 | Shreve | G06F 18/23213 |
| 2023/0316555 | A1* | 10/2023 | Spangenberg | G06V 10/82 345/419 |

OTHER PUBLICATIONS

Andreas et al., "Controlling the Hidden Layers' Output to Optimizing the Training Process in the Deep Neural Network Algorithm," 5th Annual IEEE International conference on Cyber Technology in Automation, Control, and Intelligent Systems, pp. 1028-1032. (Year: 2015).*

Glauner, Patrick Oliver, Master's Thesis, "Comparison of Training Methods for Deep Neural Networks," Imperial College London, Department of Computing, Apr. 2015, 56 pgs. (Year: 2015).*

Sze et al., "Efficient Processing of Deep Neural Networks: A Tutorial and Survey," Proceedings of the IEEE vol. 105, No. 12, Dec. 2017, pp. 2295-2329. (Year: 2017).*

Membrives, Etienne J., "Machine Learning for Optmization of Software Parameters," IP.com (IPCOM000252023D), Dec. 13, 2017, 34 pgs. (Year: 2017).*

Marquesz et al., "Deep Cascade Learning," IEE Transactions on Neural NEtworks and Learning Systems, vol. 29, No. 11, Nov. 2018, pp. 5475-5485. (Year: 2018).*

Jordan, Jeremy, "Setting the learning rate of your neural network," Mar. 1, 2018, https://www.jeremyjordan.me/nn-learning-rate, 25 pgs. (Year: 2018).*

Luttrell et al., "A Deep Transfer Learning Approach to Fine-Tuning Facial Recognition Models," 13th IEEE Conference on Industrial Electronics and Applications, 2018, pp. 2671-2676. (Year: 2018).*

LeCun, Yann, "Plenary Session 1/1.1 Deep Learning Hardware: Past, Present, and Future," 2019 IEEE International Solid-State Circuits Conference, Feb. 18, 2019, pp. 12-19. (Year: 2019).*

Menghani, Gaurav, "Efficient Deep Learning: A Survey on Making Deep Learning Models Smaller, Faster, and Better," arXiv: 2106.08962v2, Jun. 21, 2021, 44 pgs. (Year: 2021).*

He et al., "Deep Residual Learning for Image Recognition," Proceedings of the IEEE conference on computer vision and pattern recognition (CVPR), 2016, 770-778.

Lin et al., "Feature Pyramid Networks for Object Detection," Proceedings of the IEEE conference on computer vision and pattern recognition (CVPR), 2017, 2117-2125.

Simonyan et al., "Very deep convolutional networks for large-scale image recognition," Published as a conference paper at ICLR 2015, arXiv preprint arXiv:1409.1556 (Sep. 4, 2014), 14 pages.

Szegedy et al., "Inception-v4, Inception-ResNet and the Impact of Residual Connections on Learning," Proceedings of the Thirty-First AAAI Conference on Artificial Intelligence (AAAI-17), 2017, 31(1):4278-4284.

* cited by examiner

PROGRESSIVE DEEP METRIC LEARNING

CROSS-REFERENCE TO RELATED APPLICATION

This application claims the benefit of U.S. Provisional Application No. 63/220,681, filed Jul. 12, 2021, the contents of which are incorporated by reference herein.

TECHNICAL FIELD

This disclosure application relates generally to machine learning, e.g., metric learning.

BACKGROUND

Metric learning is a supervised machine learning method to learn a similarity function that measures how similar two data points are. Neural networks are machine learning models that employ multiple layers of operations to predict one or more outputs from one or more inputs. Neural networks typically include one or more hidden layers situated between an input layer and an output layer. The output of each layer is used as input to another layer in the neural network, e.g., the next hidden layer or the output layer. An architecture of a neural network specifies what layers are included in the neural network and their properties, as well as how the neurons of each layer of the neural network are connected. In other words, the architecture specifies which layers provide their output as input to which other layers and how the output is provided.

Deep metric learning uses neural networks to automatically learn discriminative features, also called feature embeddings, from training data and then compute the distance metric.

SUMMARY

The disclosed systems, methods, and techniques relate to training a deep metric learning model progressively in multiple stages. A deep metric learning model can include multiple blocks and each block can include one or more intermediate layers. Features from multiple blocks can be combined to improve the quality of the final feature embedding. The features from different blocks can be stacked on top of each other to formulate the final feature embedding.

Instead of learning the parameters of the entire model simultaneously, a training system can train a deep learning model to learn the intermediate features progressively one after another from earlier blocks to later blocks. Therefore, the training system can learn features from later blocks on top of learning features from the earlier blocks. The progressive deep metric learning can improve the quality of the final features because the features from later blocks can be complementary to the features from the earlier blocks. The progressive training of the deep metric learning model can improve the model training stability because each stage of the progressive training only trains a portion of the model, thus dividing a large model training problem into a smaller, partial model training problem.

In general, one innovative aspect of the subject matter described in this specification can be embodied in methods that include the actions of maintaining training data for training a machine learning model that will include a plurality of blocks after training; determining a number of training stages using the plurality of blocks in the machine learning model; training the machine learning model using the training data in a plurality of stages, including, for each stage: adding, from the plurality of blocks, a new block for a current stage to the machine learning model; and training the machine learning model using the training data; and outputting the trained machine learning model that includes the plurality of trained blocks.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Training the machine learning model using the training data in the plurality of stages includes, for each stage: setting a respective learning rate for each block of the machine learning model that is included in the current stage; and training the machine learning model using the training data and the respective learning rate for each block. The learning rate for the new block is larger than the learning rate of the other one or more blocks of the machine learning model that is included in the current stage. The actions include obtaining predetermined learning rates for the plurality of stages from a learning rate schedule table; and setting the respective learning rate for each block at each stage using the predetermined learning rates for the stage. The actions include computing the respective learning rate using a function that generates a set of learning rates for training the blocks at the current stage. The machine learning model is a deep metric learning model, and the actions include: providing the trained machine learning model to a property monitoring system to cause the property monitoring system to generate a feature embedding for sensor data captured by the property monitoring system, and perform a visual recognition task based on the feature embedding. For each stage, training the machine learning model using the training data includes: determining an existing embedding calculated from one or more existing blocks from one or more previous stages; determining a new embedding calculated from the new block; determining a final feature embedding using the existing embedding and the new embedding; and computing a loss term from the final feature embedding.

The subject matter described in this specification can be implemented in various embodiments and may result in one or more of the following advantages. In some implementations, the systems and methods described in this specification, e.g., that use progressive deep metric learning, can improve the quality of the object feature embeddings extracted by a neural network, e.g., a deep learning neural network. This improved quality can be because the features from later blocks can be complementary to the features from the earlier blocks. For instance, by adding a new block for a current stage to the machine learning model, the systems and methods described in this specification can improve a quality of the machine learning model. In some implementations, by setting the learning rate of the machine learning model for each stage, the systems and methods described in this specification can improve the quality of object feature embedding extracted by the machine learning model and make the training process of the machine learning model more effective.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
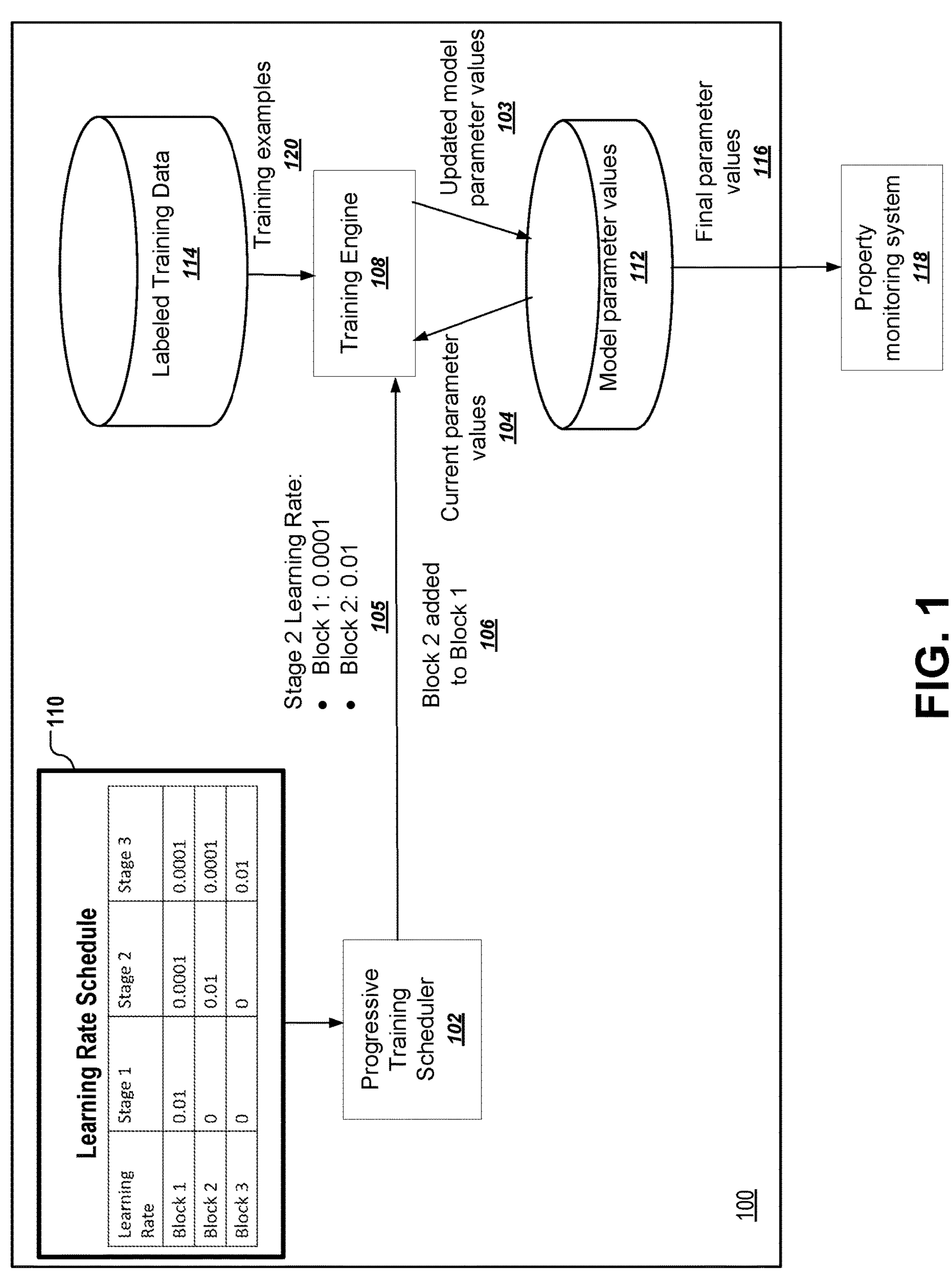
FIG. 1 is a diagram illustrating an example of a progressive deep metric learning training system.

FIG. 1 is a diagram illustrating an example of a progressive deep metric learning training system 100. The training system 100 may be hosted within a data center, which can be a distributed computing system having multiple computers in one or more locations. The training system 100 includes a training engine 108 and a progressive training scheduler 102. The training system 100 includes one or more storage systems that store the labeled training data 114, the model parameter values 112, and optionally, a learning rate schedule 110. After the training is completed, the training system 100 sends the final parameter values 116 to a property monitoring system 118, which can be located at a remote location that is away from the training system 100. For example, the training system 100 may determine final parameter values 116 for a deep learning model that extracts face embedding vectors from two face images, which can be used to determine whether two face images match, and send the deep learning model with the final parameter values 116 to a camera so that the camera can recognize known users based on face embedding vectors generated from the deep learning model.

The training system 100 includes a training engine 108 that can train a deep learning model, e.g., a deep metric learning model such as a deep metric neural network model. The training engine 108 implements the operations of each block of a deep learning model that is designed to generate feature embeddings from input images or videos. Although the training system is illustrated as generating feature embeddings from images or videos, the systems and techniques discussed here can be applied to other types of data, such as audio signals, natural language data, text data, point cloud data, and so on.

During training, a deep learning model takes multiple images as input, and each image depicts an object that can be the same object or a different object in another image. The deep learning model takes labels indicating that the pairs of images have the same or different object, e.g., labels indicating a positive pair of images that depict the same object, and labels indicating a negative pair of images that depict different objects. After training, the deep learning model can generate, for each image, a feature embedding that can be used to measure how similar or different the image is to another image.

For example, a deep metric neural network model can be trained on labeled face images with faces of the same or different persons. The labels can indicate multiple pairs of images that depict the same face of the same person, and can indicate multiple pairs of images that depict different faces of different persons. After training, the deep metric neural network model can generate a feature vector, e.g., a vector of length 512, for a new image. The feature vector can represent the discriminative features of the face of a person in the new image, and can be used to determine whether another image depicts a face of the same person by measuring the distance between feature vectors generated for the two images using the trained deep metric neural network model.

The training engine 108 can train the deep learning model progressively in multiple stages. The system includes a progressive training scheduler 102 that determines the architecture of the deep learning model and the hyper training parameters, e.g., including a set of learning rates, at each stage of the progressive training.

The training system 100 or the progressive training scheduler 102 can determine a predetermined number of stages for a neural network model. In some implementations, the neural network model can include N blocks after training, where a new block can be added to the neural network in each training stage, and each block can include one or more layers of the neural network model. Thus, the predetermined number of stages can be N and the training engine 108 can train the neural network model in N stages progressively. The number of stages/blocks can be determined according to the size of the final embedding vector and the size of intermediate embeddings from each block, because in progressive metric learning, the final embedding vector can be the concatenation of the intermediate embedding vectors generated from the individual blocks.

At each stage, the progressive training scheduler 102 determines the deep learning model at the current stage. The progressive training scheduler 102 can add a block to the blocks of the deep learning model that has been trained in the previous stage.

For example, an entire deep metric neural network model can include two blocks, block 1 and block 2. The progressive training scheduler 102 can determine an initial deep metric neural network model that includes block 1. During the first stage, the training engine 108 trains the initial deep metric neural network model and generates a set of parameters for block 1. After the first stage training, the progressive training scheduler 102 can determine an updated deep metric neural network at the second stage, e.g., adding block 2 to block 1 (106). For example, the block 2 of the updated deep metric neural network can take the first set of feature embeddings generated from block 1 as input, and can generate a second set of feature embeddings of the input image. The two sets of feature embeddings can be combined to compute a value of a loss function. Then the training engine 108 can train the updated deep metric neural network and generate a set of updated parameters for block 1 and a set of parameters for block 2 based on the value of the loss function.

At each stage, the progressive training scheduler 102 determines the hyper training parameters at the current stage, such as a set of learning rates for training each block of the neural network model at the current stage. A learning rate is a hyper-parameter that controls how much update can be applied to the parameters of the model. The learning rate for each block controls how much updates can be applied to the parameters of the layers in each block.

In some implementations, the learning rate for a newly added block can have a higher learning rate than the one or more learning rates for the one or more previously trained blocks. At each stage, the training system 100 can train the parameters for the newly added block, while making small changes or limited changes to the parameters of the one or more previously trained blocks. In this way, the intermediate features are learned progressively one after another from earlier blocks to later blocks. Therefore, features from later blocks can be learned on top of what earlier features have already learned and the features from later blocks can be complementary to the features from the earlier blocks.

For example, as shown in the learning rate schedule table 110, at stage 1, the learning rate for block 1 is 0.01. At stage 2, the learning rate for block 1 is 0.0001 and the learning rate for block 2 is 0.01. Using these learning rates, the training system 100 can apply a higher magnitude of updates to the parameters in block 2, while making small changes or limited changes to the parameters of block 1 because the parameters of block 1 have already been trained in stage 1. Therefore, after the model is fully trained, the features from block 2 can be complementary to the features of block 1.

In some implementations, the progressive training scheduler 102 can read a predetermined or previously computed learning rate from a learning rate schedule table 110. For example, the progressive training scheduler 102 can read the learning rates for training block 1 and block 2 at the stage 2. From table 110, the progressive training scheduler 102 can determine that the learning rate for block 1 is 0.0001 and the learning rate for block 2 is 0.01 (105).

In some implementations, the progressive training scheduler 102 can compute the learning rate using a function that generates a set of learning rates for training the blocks at the current stage. For example, the function can set the learning rate for a particular block at the current stage to be 0.1 times the learning rate for the particular block at the previous stage. Therefore, at stage 3, the learning rate for blocks 1, 2, 3 can be 0.0001, and 0.01.

The training engine 108 includes a plurality of computing devices having software or hardware modules that implement the respective operations of each block of the deep learning model according to an architecture of the neural network. In some implementations, the training engine can use central processing units (CPUs), graphics processing units (GPUs), highly parallelized hardware, or some combination of these to perform the training of a machine learning model.

The training engine 108 can compute the operations of each block of the deep learning model using current parameter values 104 stored in a collection of model parameter values 112. Although illustrated as being logically separated, the model parameter values 112 and the software or hardware modules performing the operations in the training engine 108 may actually be located on the same computing device or on the same memory device.

The training engine 108 can receive labeled training data 114 as input. The labeled training data 114 includes a plurality of training examples 120. Each training example 120 includes two or more images as well as one or more labels that indicate whether an object in each image is similar to another object in another image. For example, a label for metric learning for vehicle recognition can indicate whether a vehicle in a first image is the same as the vehicle in a second image. In some examples, a label for metric learning for facial recognition can include the subject identifier of the person in the facial image.

In some implementations, the training engine 108 can train the deep learning model using the same training examples 120 at each stage of the plurality of stages. In some implementations, the training engine 108 can train the deep learning model using the different training examples 120 at each stage of the plurality of stages.

The training engine 108 can generate, for each image in the training example 120, a feature embedding that represents the unique features in the image. The training engine 108 computes a value of a loss function. The loss function takes the two feature embeddings as input, measures a similarity metric between the two images, and evaluates the similarity metric based on the label in the training example 120.

The training engine 108 generates, based on the value of the loss function, the updated model parameter values 103 using an appropriate updating technique, e.g., stochastic gradient descent with backpropagation. The training engine 108 generates the updated model parameters values 103 for the blocks using the set of learning rates 105 determined by progressive training scheduler 102, e.g., more updates for the parameters of the newly added block at the current stage. The training engine 108 can then update the collection of model parameter values 112 using the updated model parameter values 103.

After training is complete, the training engine can provide a final set of model parameter values 116 for the deep learning model to a property monitoring system 118 by a wired or wireless connection. The property monitoring system 118 monitors a property, which can be a residential property or a commercial property. The property monitoring system 118 can use the deep learning model and the final set of model parameter values 116 to generate feature embeddings for images and videos captured by the property monitoring system, and to make visual recognition tasks, such as face clustering and recognition, vehicle clustering and recognition, and target association during target tracking from the images and videos.

Figure 2:
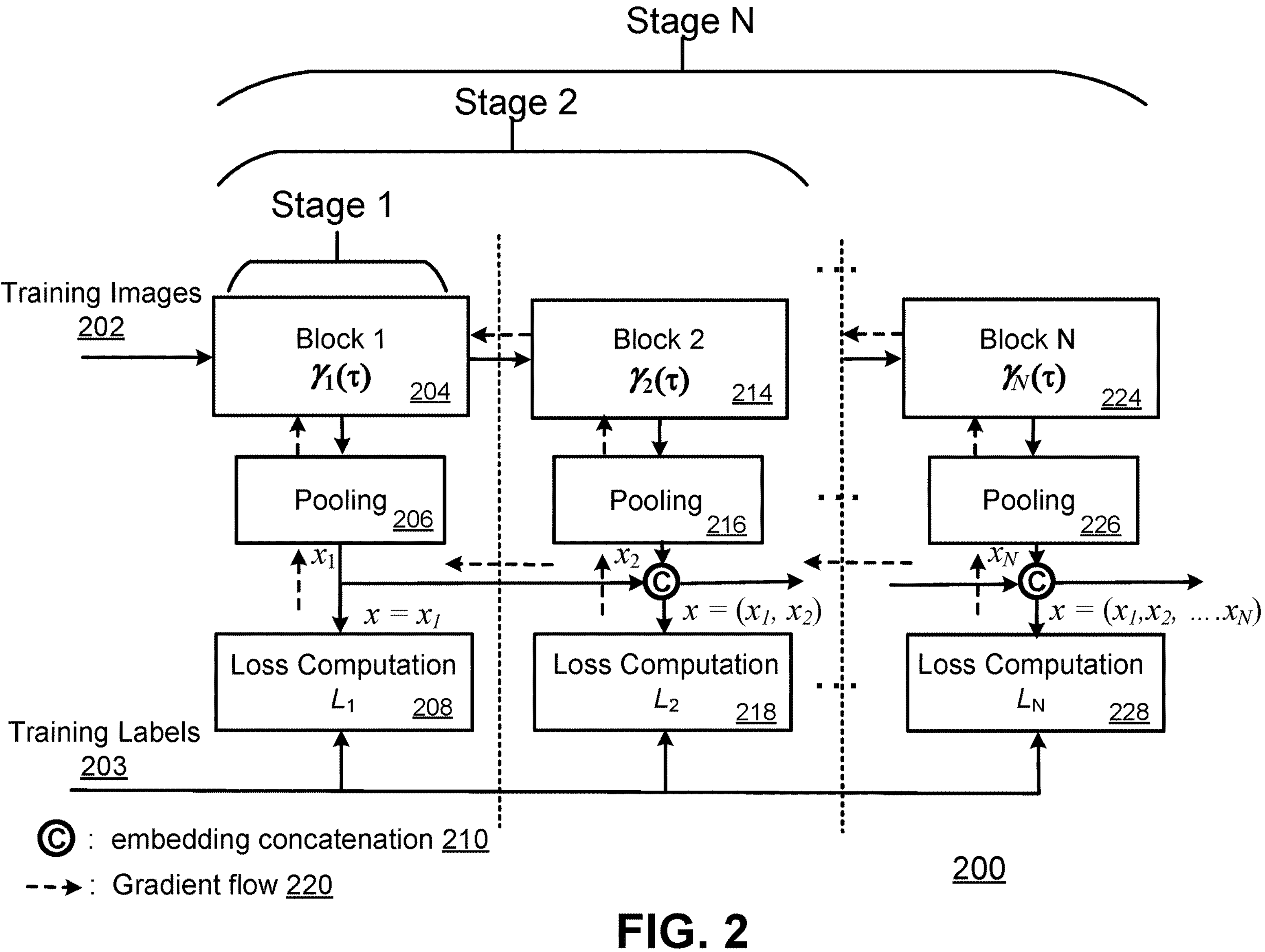
FIG. 2 is a diagram illustrating an example of progressively training a deep metric learning model.

FIG. 2 is a diagram illustrating an example of progressively training a deep metric learning model 200. The deep metric learning model 200 is trained in multiple stages. During the progressive metric learning, the deep metric learning model 200 is trained on the training images 202 and is trained progressively by gradually adding blocks, one block at a time in each stage. Once a new training stage starts, a new block is added to the previously trained blocks and the parameters of the newly added block are learned on top of the existing embeddings.

For example, the deep metric learning model 200 can be trained in N stages, with a stage number $\tau=1, 2, \ldots, N$. At stage 1, the training system 100 trains the block 1 (204) of the deep metric learning model. At stage 2, the training system 100 adds the block 2 (214) to the block 1 (204). The training system 100 trains both block 1 and block 2. At stage N, the training system 100 adds the block N (224) to the blocks from 1 to N−1. The training system trains the entire model that includes all the blocks from block 1 to block N.

The deep metric learning model 200 can be a convolutional neural network (CNN). The CNN includes a number of convolutional layers and each convolutional layer has parameters whose values define the convolutional filters for the layer. Each layer in CNN includes one or more neurons. A neuron in a neural network is a mathematical function that computes an output signal based on one or more input signals, and each neuron has learnable weights. The CNN can also include pooling layers, fully-connected layers, and other kinds of layers. Example architectures of CNN include VGG network, Residual Neural Network, Feature Pyramid Network, Inception®-V4 neural network, and so on.

Each block of the deep metric learning model 200 can include one or more layers or submodules of the deep metric learning model 200. In some implementations, the first block can include a backbone neural network model that has more layers than the number of layers in the other blocks. For example, block 1 (204) can be a Residual Neural Network backbone neural network model, and block 2 can include one or more convolutional layers, which has fewer parameters than the Residual Neural Network backbone. In some implementations, the CNN model can be divided into multiple submodules and each block can include one of the submodules of the CNN model. For example, the Residual Neural Network-18 model can include 5 submodules. The deep metric learning model 200 can include five blocks, and each block can implement one submodule of the Residual Neural Network-18 model.

The output of each block goes through a pooling layer to extract an intermediate feature embedding, and all the intermediate feature embeddings are concatenated using one or more concatenation layers 210 to form the final embedding. The concatenation layers 210 can generate a concatenation of two or more feature embeddings, such as addition, subtraction, multiplication, or a combination of the two or more feature embeddings.

For example, the pooling layer 206 takes the output from block 1 and generates the intermediate feature embedding of block 1, i.e., a feature vector $x_1$. The intermediate feature embedding of block 2 is the output from the pooling layer 216 and is a feature vector $x_2$. The intermediate feature embedding of block N is the output from the pooling layer 226 and is a feature vector $x_N$. At stage 1, the final embedding is the feature vector $x=x_1$. At stage 2, the final embedding is the concatenation, e.g., a combination, of the feature embeddings from block 1 and block 2, i.e., the feature vector $x=(x_1, x_2)$. At stage N, the final embedding is the concatenation, e.g., a combination, of the feature embeddings from block 1, block 2, . . . , to block N, i.e., the feature vector $x=(x_1, x_2, \ldots, x_N)$.

Each intermediate feature embedding can be a vector of a certain length determined by the one or more layers of the blocks and the pooling layer. For example, the size of the feature vector $x_1$ or $x_2$ can be 128, 256, or 1024.

The training system 100 computes a loss function based on the final feature embedding x at each stage and the training labels 203. Examples of loss function for deep metric learning include contrastive loss, triplet loss, lifted structure loss, N-pair loss, angular loss, proxy-based loss, or a combination of these.

The parameters of blocks at each stage can be updated based on the result of the loss computation using an appropriate updating technique. For example, at stage 1, the training system 100 computes a loss $L_1$ 208 based on the final feature embedding $x=x_1$, and the parameters of the block 1 can be updated based on the loss $L_1$ 208 using stochastic gradient descent with backpropagation through the gradient flow 220. At stage 2, the training system computes a loss $L_2$ 218 based on the final feature embedding $x=(x_1, x_2)$. The parameters of the block 2 and block 1 can be updated based on the loss $L_2$ 218 using stochastic gradient descent with backpropagation through the gradient flow 220. At stage N, the training system computes a loss $L_N$ 228 based on the final feature embedding $x=(x_1, x_2, \ldots, x_N)$. The parameters of all the blocks can be updated based on the loss $L_N$ 228 using stochastic gradient descent with backpropagation through the gradient flow 220.

In some implementations, the amount of the updates to each block can be regulated by the learning rate of each block. The training system can dynamically adjust the learning rate during the training stages. In some implementations, at each stage, the learning rate for the newly added block can be larger than the learning rate for the previously trained blocks. In this way, the new feature embedding from the new block can be trained to be complementary to the existing embeddings that are already learned by the existing blocks. In some implementations, the learning rate of each block can be decreasing or increasing dynamically from one stage to the next stage, in order to improve the quality of the object feature embedding extracted by the machine learning model and make the training process of the machine learning model more effective.

In some implementations, the loss term computed directly from the existing blocks can be deactivated, e.g., the loss term $L_1$ can be deactivated at stage 2. The training system computes the loss term from the new block. That is, the training system computes the loss term from the final feature embedding concatenated from the existing embeddings from the existing blocks and the new embedding from the new block. Therefore, the quality of the final feature embedding can be improved because at each stage the training is focused on the feature embedding of the new block.

For example, consider the first two stages of the model training. At stage 1, the training system trains the parameters of the first block 204 based on the loss $L_1$ and the feature embedding $x_1$ can be computed from the first block 204. At stage 2, a new block 214 is added, and a new feature embedding $x_2$ can be generated by the new block. The two feature embeddings can be concatenated to form the feature embedding $x=(x_1, x_2)$. The loss $L_1$ is deactivated, i.e., no longer computed and used. The training system computes the new loss term $L_2$ based on the feature embedding $x=(x_1, x_2)$. The parameters of the first block 204 can still be updated with a reduced learning rate $\gamma_1(\tau=2)<\gamma_1(\tau=1)$. In this way, the parameters of block 1 are updated only slightly during the second stage and most of the model adjustments take place in the parameters of block 2 such that the feature embedding $x_2$ is complimentary to the feature embedding $x_1$.

In some implementations, the learning rate $\gamma$ can be a function of the stage number $\tau=1, 2, \ldots, N$. For example, the learning rate $\gamma$ for the training block 1 at the first, second and third stages can be 0.01, 0.001, and 0.0001. In some implementations, the training system 100 can predetermine a learning rate schedule, e.g., the learning rate schedule table 110. The training system 100 can use a progressive training scheduler 102 to read the predetermined learning rate for each block at each training stage.

Figure 3:
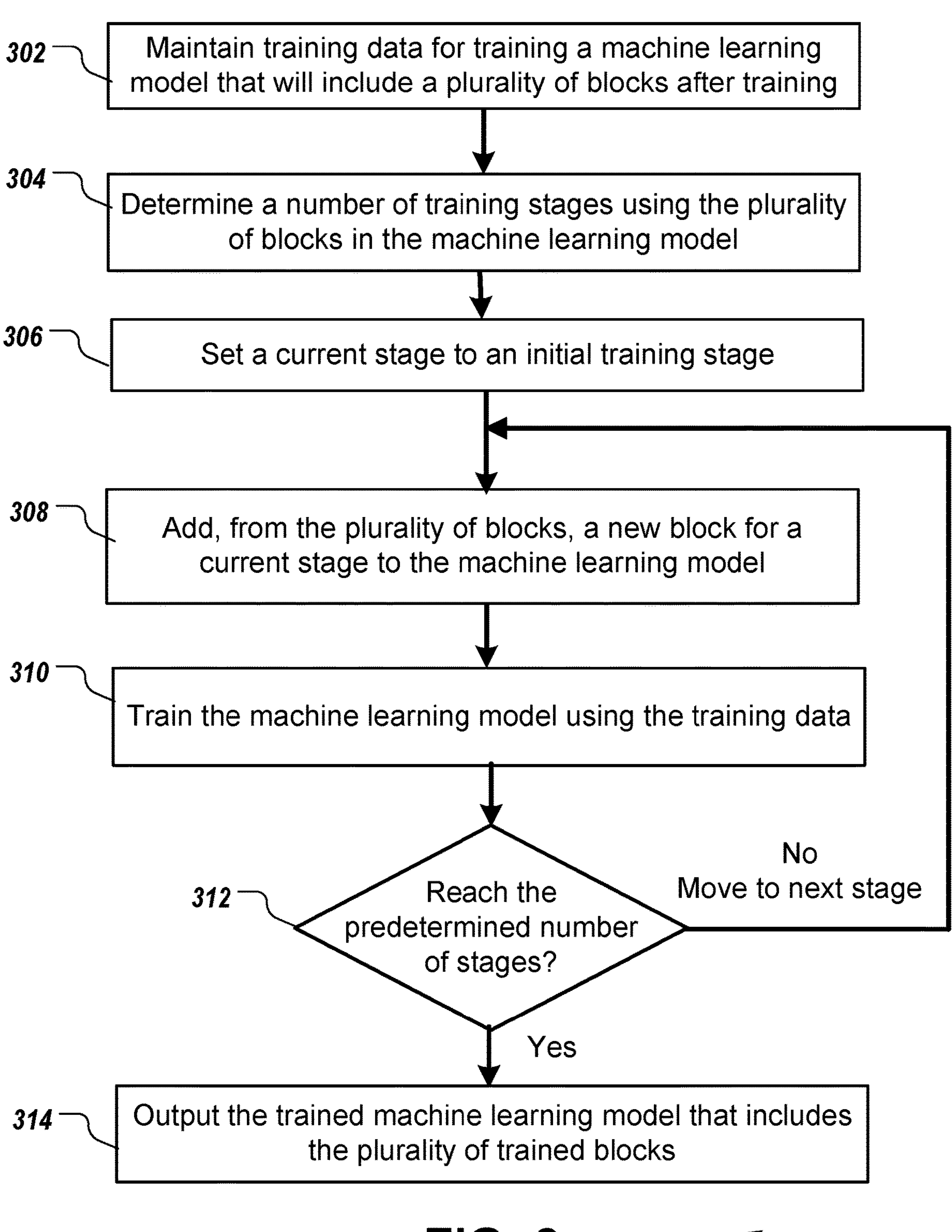
FIG. 3 is a flow chart illustrating an example of a process for progressive deep metric learning.

FIG. 3 is a flow chart illustrating an example of a process 300 for progressive deep metric learning. The process 300 can be performed by one or more computer systems, for example, the training engine 108, the progressive training scheduler 102, the training system 100, or a combination of these. In some implementations, some or all of the process 300 can be performed by the training system 100, or by another computer system located at another location.

The system maintains training data for training a machine learning model that can include a plurality of blocks after training (302). In some implementations, the system can obtain the training data from a database. In some implementations, the machine learning model can be a deep metric learning model that is going to be used in deep metric learning. The training data includes a plurality of training examples of images or videos. Although the training system is illustrated using training data that includes images or videos, the systems and techniques discussed here can be applied to other types of data, such as audio signals, natural language data, text data, point cloud data, and so on. The images or videos in the training example depict similar or different objects. For example, the training example can include a pair of images that depict the same vehicle captured at a different time and/or location near a property that is monitored. In some examples, the training example can include a pair of images that depict the same face of a resident of the property that is monitored. The training data can include a label for each training example and the label can indicate whether the images in the training example are similar or different.

The system determines a number of training stages using the plurality of blocks in the machine learning model (304). In some implementations, the system can determine the number of training stages based on an architecture of the machine learning model that is going to be used in deep metric learning. The system can divide the machine learning model into a plurality of submodules. For example, a submodule can include two consecutive convolutional layers, followed by a pooling layer. The system can determine the number of training stages based on the number of total submodules in the machine learning model. In some implementations, the system can determine the number of training stages based on the number of additional blocks to be added to a machine learning model backbone which is trained in an initial training stage, e.g., the stage 1 in FIG. 2. The system can determine that the number of training stages equals the number of additional blocks plus one. For example, if the system determines to add three additional blocks to a Residual Neural Network model backbone, the system can determine that the number of training stages equals four.

The system sets a current stage to an initial training stage (306). The initial training stage is the first stage. The system can set a current stage to an initial stage by determining a first block of the machine learning model. The system can obtain a learning rate for the first block of the machine learning model and can train the first block of the machine learning model. During the initial training stage, the system can determine, based on the training data, first stage values for the parameters of the first block of the machine learning model in accordance with the first learning rate. For example, as depicted in FIG. 2, the system can determine the parameters of block 1 (204) of the machine learning model by performing training using the first learning rate $\gamma_1(\tau=1)$.

The system adds, from the plurality of blocks, a new block for a current stage to the machine learning model (308). The new block receives outputs from the previous blocks of the machine learning model that are trained at a previous stage. For example, at the second stage, the system adds a new block, e.g., block 2 (214) in FIG. 2, to block 1 (204) of the machine learning model. The new block, e.g., block 2 (214) receives outputs from block 1 (204) that are trained at the initial training stage.

In some implementations, the system can set a respective learning rate for each block of the machine learning model that is included in the current stage. For example, at the second stage, the system can obtain a set of learning rates for the first block of the machine learning model and a second block of the machine learning model. The system can set a learning rate $\gamma_1(\tau=2)$ for the first block, and can set a learning rate $\gamma_2(\tau=2)$ for the second block.

In some implementations, the learning rate for the new block can be larger than the learning rate of the other one or more blocks of the machine learning model that is included in the current stage. The system can set the learning rates for the blocks such that the learning rate for the newly added block is higher than the learning rate for the one or more blocks that have been previously trained. For example, the system can reduce the learning rate for a block that has been previously trained. Therefore, the training system can quickly update the parameters of the newly added block, while still allowing small changes to the parameters of the blocks that have been previously trained.

In some implementations, the system can obtain predetermined learning rates for the plurality of stages from a learning rate schedule table, and the system can set the respective learning rate for each block at each stage using the predetermined rate for the stage. In some implementations, the system can compute the respective learning rate using a function that can generate a set of learning rates for training the blocks at the current stage.

The system trains the machine learning model using the training data (310). In some implementations, the system can train the machine learning model using the training data and the respective learning rate for each block. For example, at the second stage, the system can determine, based on the training data and based on the previously trained parameters for the first block of the machine learning model, second stage values for the parameters of the first block and the second block of the machine learning model in accordance with the set of learning rates. The second stage values include the trained parameters of the first block and the trained parameters of the second block of the machine learning model.

In some implementations, the system can compute a loss term from the new block and can deactivate one or more loss terms computed from the other one or more blocks of the machine learning model that is included in the current stage. The system can determine an existing embedding calculated from one or more existing blocks from one or more previous stages. The system can determine a new embedding calculated from the new block. The system can determine a final feature embedding using the existing embedding and the new embedding. The system can compute a loss term from the final feature embedding, e.g., without computing a loss term directly from the existing embedding calculated from one or more existing blocks from one or more previous stages. Thus, the overall training model loss, e.g., a loss based on the final feature embedding, can stay the same throughout all the training stages, which can improve the quality of the concatenated feature embedding up to the latest block.

The system determines whether the training of the machine learning model has reached the predetermined number of training stages (312). The system can compare the current stage number with the predetermined number of training stages determined in step 304.

If the system determines that the training of the machine learning model has not reached the predetermined number of training stages, the system adds a new block for a current stage to the machine learning model (308), and continues to perform the steps in 310 and 312. For example, if the predetermined number of training stages equals N, after the training in stage 2, the system can determine that the training of the machine learning model has not reached the predetermined number of training stages. The system can add a third block to the machine learning model and can continue the training until the system reaches the predetermined N training stages, i.e., until the system finishes the training in stage N.

If the system determines that the training of the machine learning model has reached the predetermined number of training stages, the system outputs the trained machine learning model that includes the plurality of trained blocks (314). For example, for a machine learning model that includes two blocks, the system can provide the trained machine learning model for output based on the second stage values. The system can provide the trained deep metric learning model to a property monitoring system 118 to cause the property monitoring system 118 to generate a feature embedding for sensor data captured by the property monitoring system 118, and to perform a visual recognition task based on the feature embedding. For example, the property monitoring system 118 can use the trained metric learning model to generate feature embeddings for the images or videos captured by the property monitoring system 118. The property monitoring system 118 can use the feature embedding in one or more visual recognition tasks, including clustering, recognition, tracking of persons, faces, animals, vehicles, or other objects of interest inside or near the property that the system monitors through one or more cameras.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used.

Figure 4:
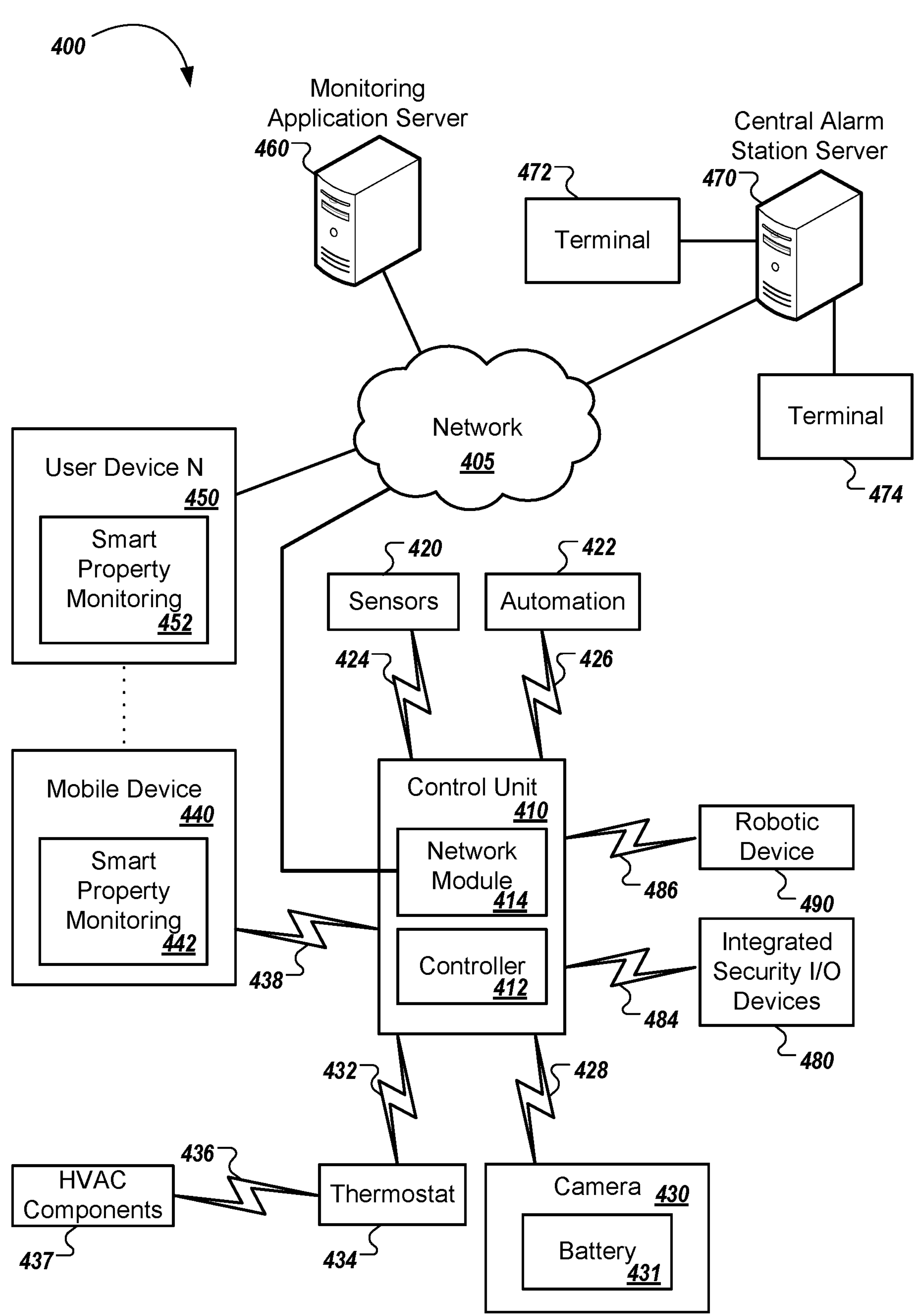
FIG. 4 is a diagram illustrating an example of a property monitoring system.

FIG. 4 is a diagram illustrating an example of a property monitoring system 400. The property monitoring system 400 includes a network 405, a control unit 410, one or more user devices 440 and 450, a monitoring application server 460, and a central alarm station server 470. In some examples, the network 405 facilitates communications between the control unit 410, the one or more user devices 440 and 450, the monitoring application server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system 400 may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the property. The health monitoring sensor can collect various health data, including pulse, heart-rate, respiration rate, sugar or glucose level, bodily temperature, or motion data. The sensors 420 can include a radio-frequency identification (RFID) sensor that identifies a particular article that includes a pre-assigned RFID tag.

The control unit 410 communicates with the module 422 and a camera 430 to perform monitoring. The module 422 is connected to one or more devices that enable property automation, e.g., home or business automation. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave® locks using wireless communications in the Z-Wave® protocol). Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the control unit 410. For instance, the module 422 may cause a lighting system to illuminate an area to provide a better image of the area when captured by a camera 430. The camera 430 can include one or more batteries 431 that require charging.

A drone 490 can be used to survey the electronic system 400. In particular, the drone 490 can capture images of each item found in the electronic system 400 and provide images to the control unit 410 for further processing. Alternatively, the drone 490 can process the images to determine an identification of the items found in the electronic system 400.

The camera 430 may be a video/photographic camera or other type of optical sensing device configured to capture images. For instance, the camera 430 may be configured to capture images of an area within a property monitored by the control unit 410. The camera 430 may be configured to capture single, static images of the area or video images of the area in which multiple images of the area are captured at a relatively high frequency (e.g., thirty images per second) or both. The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave® controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries, e.g., if located remotely from the control unit 410. The camera 430 may employ a small solar cell to recharge the battery when light is available. The camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the control unit 410 and the camera 430 receives commands related to operation from the monitoring application server 460.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more module 422.

A module 437 is connected to one or more components of an HVAC system associated with a property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in security monitoring. For example, the robotic devices 490 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan and/or a three-dimensional model of the property that enables the robotic devices 490 to navigate the property. During initial configuration, the robotic devices 490 may receive the data describing attributes of the property, determine a frame of reference to the data (e.g., a property or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a property charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the property and users in the property. The one or more biometric data collection tools may be configured to collect biometric samples of a person in the property with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi® module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth®, Bluetooth® LE, Z-wave®, Zigbee®, etc., may be used to allow the robotic devices 490 to communicate with other devices in the property. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the property. The robotic devices 490 may be configured to navigate to the charging stations after completion of tasks needed to be performed for the property monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the property monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive sensor data from the sensors 420 and determine whether to provide an alert to the one or more integrated security input/output devices 480.

The sensors 420, the module 422, the camera 430, the thermostat 434, and the integrated security devices 480 may communicate with the controller 412 over communication links 424, 426, 428, 432, 438, 484, and 486. The communication links 424, 426, 428, 432, 438, 484, and 486 may be a wired or wireless data pathway configured to transmit signals from the sensors 420, the module 422, the camera 430, the thermostat 434, the drone 490, and the integrated security devices 480 to the controller 412. The sensors 420, the module 422, the camera 430, the thermostat 434, the drone 490, and the integrated security devices 480 may continuously transmit sensed values to the controller 412, periodically transmit sensed values to the controller 412, or transmit sensed values to the controller 412 in response to a change in a sensed value. In some implementations, the drone 490 can communicate with the monitoring application server 460 over network 405. The drone 490 can connect and communicate with the monitoring application server 460 using a Wi-Fi or a cellular connection.

The communication links 424, 426, 428, 432, 438, 484, and 486 may include a local network. The sensors 420, the module 422, the camera 430, the thermostat 434, the drone 490 and the integrated security devices 480, and the controller 412 may exchange data and commands over the local network. The local network may include 802.11 "Wi-Fi®" wireless Ethernet (e.g., using low-power Wi-Fi® chipsets), Z-Wave®, Zigbee®, Bluetooth®, "HomePlug®" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 460 is an electronic device configured to provide monitoring services by exchanging electronic communications with the control unit 410, the one or more user devices 440 and 450, and the central alarm station server 470 over the network 405. For example, the monitoring application server 460 may be configured to monitor events (e.g., alarm events) generated by the control unit 410. In this example, the monitoring application server 460 may exchange electronic communications with the network module 414 included in the control unit 410 to receive information regarding events (e.g., alerts) detected by the control unit 410. The monitoring application server 460 also may receive information regarding events (e.g., alerts) from the one or more user devices 440 and 450.

In some examples, the monitoring application server 460 may route alert data received from the network module 414 or the one or more user devices 440 and 450 to the central alarm station server 470. For example, the monitoring application server 460 may transmit the alert data to the central alarm station server 470 over the network 405.

The monitoring application server 460 may store sensor and image data received from the monitoring system 400 and perform analysis of sensor and image data received from the monitoring system 400. Based on the analysis, the monitoring application server 460 may communicate with and control aspects of the control unit 410 or the one or more user devices 440 and 450.

The monitoring application server 460 may provide various monitoring services to the system 400. For example, the monitoring application server 460 may analyze the sensor, image, and other data to determine an activity pattern of a resident of the property monitored by the system 400. In some implementations, the monitoring application server 460 may analyze the data for alarm conditions or may determine and perform actions at the property by issuing commands to one or more of the controls 422, possibly through the control unit 410.

The central alarm station server 470 is an electronic device configured to provide alarm monitoring service by exchanging communications with the control unit 410, the one or more mobile devices 440 and 450, and the monitoring application server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring application server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440 and 450 are devices that host and display user interfaces. For instance, the user device 440 is a mobile device that hosts or runs one or more native applications (e.g., the smart property application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry®-type devices (e.g., as provided by Research in Motion), electronic organizers, iPhone®-type devices (e.g., as provided by Apple), iPod® devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart property application 442. The smart property application 442 refers to a software/firmware program running on the corresponding mobile device that enables the user interface and features described throughout. The user device 440 may load or install the smart property application 442 based on data received over a network or data received from local media. The smart property application 442 runs on mobile devices platforms, such as iPhone®, iPod Touch®, Blackberry®, Google Android®, Windows Mobile®, etc. The smart property application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the control unit 410 over the network 405. The user device 450 may be configured to display a smart property user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi®, Bluetooth®, Z-wave®, Zigbee®, HomePlug® (Ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring application server 460 may relay data received from the control unit 410 to the one or more user devices 440 and 450 through the network 405. In this regard, the monitoring application server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring application server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring application server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the module 422, the camera 430, and the robotic devices, e.g., that can include the drone 490. The one or more user devices 440 and 450 receive data directly from the sensors 420, the module 422, the camera 430, and the robotic devices and send data directly to the sensors 420, the module 422, the camera 430, and the robotic devices. The one or more user devices 440, 450 provide the appropriate interfaces/processing to provide visual surveillance and reporting.

In other implementations, the system 400 further includes network 405 and the sensors 420, the module 422, the camera 430, the thermostat 434, and the robotic devices are configured to communicate sensor and image data to the one or more user devices 440 and 450 over network 405 (e.g., the Internet, cellular network, etc.). In yet another implementation, the sensors 420, the module 422, the camera 430, the thermostat 434, and the robotic devices are intelligent enough to change the communication pathway from a direct local pathway when the one or more user devices 440 and 450 are in close physical proximity to the sensors 420, the module 422, the camera 430, the thermostat 434, and the robotic devices to a pathway over network 405 when the one or more user devices 440 and 450 are farther from the sensors 420, the module 422, the camera 430, the thermostat 434, and the robotic devices. In some examples, the system leverages GPS information from the one or more user devices 440 and 450 to determine whether the one or more user devices 440 and 450 are close enough to the sensors 420, the module 422, the camera 430, the thermostat 434, and the robotic devices to use the direct local pathway or whether the one or more user devices 440 and 450 are far enough from the sensors 420, the module 422, the camera 430, the thermostat 434, and the robotic devices that the pathway over network 405 is required. In other examples, the system leverages status communications (e.g., pinging) between the one or more user devices 440 and 450 and the sensors 420, the module 422, the camera 430, the thermostat 434, and the robotic devices to determine whether communication using the direct local pathway is possible. If communication using the direct local pathway is possible, the one or more user devices 440 and 450 communicate with the sensors 420, the module 422, the camera 430, the thermostat 434, and the robotic devices using the direct local pathway. If communication using the direct local pathway is not possible, the one or more user devices 440 and 450 communicate with the sensors 420, the module 422, the camera 430, the thermostat 434, and the robotic devices using the pathway over network 405.

In some implementations, the system 400 provides end users with access to images captured by the camera 430 to aid in decision-making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system 400 and other events sensed by the monitoring system 400 may be used to enable/disable video/image recording devices (e.g., the camera 430). In these implementations, the camera 430 may be set to capture images on a periodic basis when the alarm system is armed in an "away" state, but set not to capture images when the alarm system is armed in a "stay" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:

maintaining training data for training a machine learning model that will comprise a plurality of blocks after training;

determining a number of training stages using the plurality of blocks in the machine learning model;

training the machine learning model using the training data in a plurality of training stages, comprising, for each stage:

adding, from the plurality of blocks, a new block for a current stage to the machine learning model;

selecting, for each block in the machine learning model including the new block, a respective learning rate for the block of the machine learning model, at least a first learning rate for a first block in the machine learning model different than a second learning rate for a second block in the machine learning model; and training the machine learning model using the training data and the respective learning rate for each block in the machine learning model; and outputting the trained machine learning model that includes the plurality of trained blocks.

2. The method of claim 1, wherein the learning rate for the new block is larger than the learning rate of the other one or more blocks of the machine learning model that is included in the current stage.

3. The method of claim 1, comprising:

obtaining predetermined learning rates for the plurality of training stages from a learning rate schedule table; and setting the respective learning rate for each block at each stage using the predetermined learning rates for the stage.

4. The method of claim 1, comprising:

computing the respective learning rate using a computer process that generates, for each block included in the machine learning model, the respective learning rate for the current stage of training the machine learning model.

5. The method of claim 1, wherein the machine learning model is a deep metric learning model, and wherein outputting the trained machine learning model comprises:

providing the trained machine learning model to a property monitoring system to cause the property monitoring system to:

generate a feature embedding for sensor data captured by the property monitoring system; and perform a visual recognition task based on the feature embedding.

6. The method of claim 1, wherein, for each stage, training the machine learning model using the training data comprises:

determining an existing embedding calculated from one or more existing blocks from one or more previous stages;

determining a new embedding calculated from the new block;

determining a final feature embedding using the existing embedding and the new embedding; and computing a loss term using the final feature embedding.

7. The method of claim 6, wherein determining the final feature embedding using the existing embedding and the new embedding comprises:

combining the existing embedding and the new embedding to generate the final feature embedding.

8. The method of claim 6, wherein determining the final feature embedding using the existing embedding and the new embedding comprises:

concatenating the existing embedding and the new embedding to generate the final feature embedding.

9. The method of claim 6, comprising: updating parameters of at least the new block in the machine learning model using the loss term.

10. A system comprising one or more computers and one or more storage devices on which are stored instructions that are operable, when executed by the one or more computers, to cause the one or more computers to perform operations comprising:

maintaining training data for training a machine learning model that will comprise a plurality of blocks after training;

determining a number of training stages using the plurality of blocks in the machine learning model;

training the machine learning model using the training data in a plurality of training stages, comprising, for each stage:

adding, from the plurality of blocks, a new block for a current stage to the machine learning model;

selecting, for each block in the machine learning model including the new block, a respective learning rate for the block of the machine learning model, at least a first learning rate for a first block in the machine learning model different than a second learning rate for a second block in the machine learning model; and training the machine learning model using the training data and the respective learning rate for each block in the machine learning model; and outputting the trained machine learning model that includes the plurality of trained blocks.

11. The system of claim 10, wherein the learning rate for the new block is larger than the learning rate of the other one or more blocks of the machine learning model that is included in the current stage.

12. The system of claim 10, wherein the operations comprise:

obtaining predetermined learning rates for the plurality of training stages from a learning rate schedule table; and setting the respective learning rate for each block at each stage using the predetermined learning rates for the stage.

13. The system of claim 10, wherein the operations comprise:

computing the respective learning rate using a computer process that generates, for each block included in the machine learning model, the respective learning rate for the current stage of training the machine learning model.

14. The system of claim 10, wherein the machine learning model is a deep metric learning model, wherein outputting the trained machine learning model comprises:

providing the trained machine learning model to a property monitoring system to cause the property monitoring system to:

generate a feature embedding for sensor data captured by the property monitoring system; and perform a visual recognition task based on the feature embedding.

15. The system of claim 10, wherein, for each stage, training the machine learning model using the training data comprises:

determining an existing embedding calculated from one or more existing blocks from one or more previous stages;

determining a new embedding calculated from the new block;

determining a final feature embedding using the existing embedding and the new embedding; and computing a loss term using the final feature embedding.

16. A non-transitory computer storage medium encoded with instructions that, when executed by one or more computers, cause the one or more computers to perform operations comprising:

maintaining training data for training a machine learning model that will comprise a plurality of blocks after training;

determining a number of training stages using the plurality of blocks in the machine learning model;

training the machine learning model using the training data in a plurality of training stages, comprising, for each stage:

adding, from the plurality of blocks, a new block for a current stage to the machine learning model;

selecting, for each block in the machine learning model including the new block, a respective learning rate for the block of the machine learning model, at least a first learning rate for a first block in the machine learning model different than a second learning rate for a second block in the machine learning model; and training the machine learning model using the training data and the respective learning rate for each block in the machine learning model; and outputting the trained machine learning model that includes the plurality of trained blocks.

17. The non-transitory computer storage medium of claim 16, wherein the learning rate for the new block is larger than the learning rate of the other one or more blocks of the machine learning model that is included in the current stage.

18. The non-transitory computer storage medium of claim 16, wherein the operations comprise:

obtaining predetermined learning rates for the plurality of training stages from a learning rate schedule table; and setting the respective learning rate for each block at each stage using the predetermined learning rates for the stage.

19. The non-transitory computer storage medium of claim 16, wherein the operations comprise:

computing the respective learning rate using a computer process that generates, for each block included in the machine learning model, the respective learning rate for the current stage of training the machine learning model.

20. The non-transitory computer storage medium of claim 16, wherein the machine learning model is a deep metric learning model, wherein outputting the trained machine learning model comprises:

providing the trained machine learning model to a property monitoring system to cause the property monitoring system to:

generate a feature embedding for sensor data captured by the property monitoring system; and perform a visual recognition task based on the feature embedding.

* * * * *